US010140237B2

(12) United States Patent
She

(10) Patent No.: US 10,140,237 B2
(45) Date of Patent: Nov. 27, 2018

(54) FAIL FUNCTIONAL AUTOMATED DRIVING

(71) Applicant: Ford Global Technologies, LLC, Dearborn, MI (US)

(72) Inventor: Eric She, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 275 days.

(21) Appl. No.: 15/280,923

(22) Filed: Sep. 29, 2016

(65) Prior Publication Data
US 2018/0089133 A1 Mar. 29, 2018

(51) Int. Cl.
G06F 13/14 (2006.01)
G06F 13/40 (2006.01)
B60R 16/023 (2006.01)
G06F 13/42 (2006.01)

(52) U.S. Cl.
CPC ........ G06F 13/4068 (2013.01); B60R 16/023 (2013.01); G06F 13/4282 (2013.01)

(58) Field of Classification Search
None
See application file for complete search history.

(56) References Cited

U.S. PATENT DOCUMENTS

| 4,869,334 A | 9/1989 | Marumoto et al. |
| 7,837,278 B2 | 11/2010 | Nilsson |
| 9,195,232 B1 | 11/2015 | Egnor et al. |
| 2003/0016624 A1 | 1/2003 | Bare |
| 2005/0115753 A1 | 6/2005 | Pemberton et al. |
| 2010/0097926 A1 | 4/2010 | Huang et al. |
| 2015/0085645 A1 | 3/2015 | Kim et al. |
| 2015/0117222 A1 | 4/2015 | Saad et al. |
| 2015/0274027 A1 | 10/2015 | Crombez et al. |
| 2016/0009235 A1 | 1/2016 | Joyce et al. |

FOREIGN PATENT DOCUMENTS

WO    WO 2015155133 A1    10/2015

OTHER PUBLICATIONS

Gibbs, "Google's self-driving car: how does it work and when can we drive one?", The Guardian, Jul. 2, 2016, https://www.theguardian.com/technology/2014/may/28/google-self-driving-car-how-does-it-work (4 pages).
UKIPO Search Report for Application No. GB1715260.4 dated Feb. 19, 2018 (4 pages).

*Primary Examiner* — Cheng Yuan Tseng
(74) *Attorney, Agent, or Firm* — Frank A. MacKenzie; Bejin Bieneman PLC

(57) ABSTRACT

A vehicle system includes a first communication path and a second communication path. The vehicle system further includes a processor programmed to determine a first communication speed associated with communicating over the first communication path and a secondary communication speed associated with communicating over the second communication path. The processor commands a first vehicle subsystem to communicate over the first communication path or the second communication path based at least in part on the first communication speed and the secondary communication speed.

15 Claims, 4 Drawing Sheets

| | Primary Steering | Secondary Steering | Primary Brake | Secondary Brake | Primary Powertrain | Secondary Powertrain |
|---|---|---|---|---|---|---|
| Primary Steering | 0 | 10 | 20 | ∞ | 20 | ∞ |
| Secondary Steering | 10 | 0 | ∞ | 20 | ∞ | 20 |
| Primary Brake | 20 | ∞ | 0 | 10 | 20 | ∞ |
| Secondary Brake | ∞ | 20 | 10 | 0 | ∞ | 20 |
| Primary Powertrain | 20 | ∞ | 20 | ∞ | 0 | 10 |
| Secondary Powertrain | ∞ | 20 | ∞ | 20 | 10 | 0 |

FAIL FUNCTIONAL AUTOMATED DRIVING

BACKGROUND

Vehicle communications occur according to various signal routes. Redundant communication paths make communication possible even if one of the communication paths fails. Redundant controllers allow vehicle subsystems to remain operational if one of the controllers should fail.

DETAILED DESCRIPTION

A vehicle processor can monitor subsystem operations and arbitrate subsystem failures. Arbitrating subsystem failures could include rerouting communications from one subsystem to another subsystem. Not all communication paths are equal, however. For example, transmitting messages from one subsystem to another over one communication path may be slower than if the message were transmitter over a different communication path. Further, the speed at which messages are transmitted over a communication path may change periodically.

One solution is a vehicle system, referred to below as a signal routing system, that can reroute signals over different communication paths according to the speeds of the different possible communication paths. An example vehicle system includes a first communication path and a second communication path. The vehicle system further includes a processor programmed to determine a first communication speed associated with communicating over the first communication path and a secondary communication speed associated with communicating over the second communication path. The processor commands a first vehicle subsystem to communicate over the first communication path or the second communication path based at least in part on the first communication speed and the secondary communication speed.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
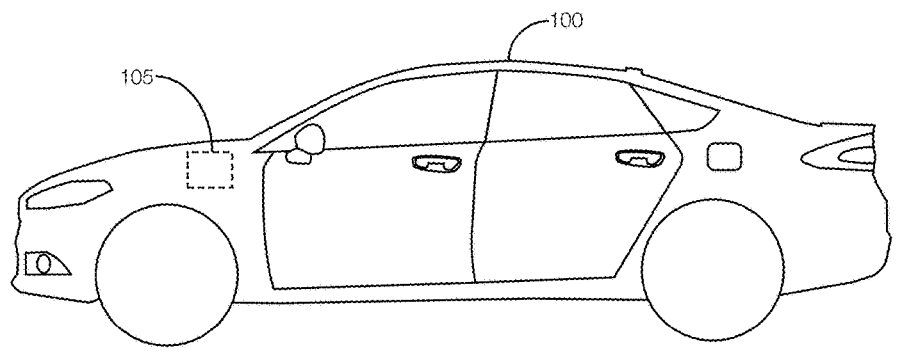
FIG. 1 illustrates an example vehicle with a signal routing system for rerouting signal communications over different communication paths.

As illustrated in FIG. 1, a host vehicle 100 includes a signal routing system 105 that periodically determines communication speeds associated with different communication paths and instructs vehicle subsystems to communicate in accordance with the fastest communication path given the subsystem that originates the communication and the target recipient of the communication. The signal routing system 105 may instruct subsystems to communicate over particular paths in response to detecting that a previously available path is no longer available, which may occur if one subsystem fails.

Although illustrated as a sedan, the host vehicle 100 may include any passenger or commercial automobile such as a car, a truck, a sport utility vehicle, a crossover vehicle, a van, a minivan, a taxi, a bus, etc. In some possible implementations, the host vehicle 100 is an autonomous vehicle that can operate in an autonomous (e.g., driverless) mode, a partially autonomous mode, and/or a non-autonomous mode.

Figure 2:
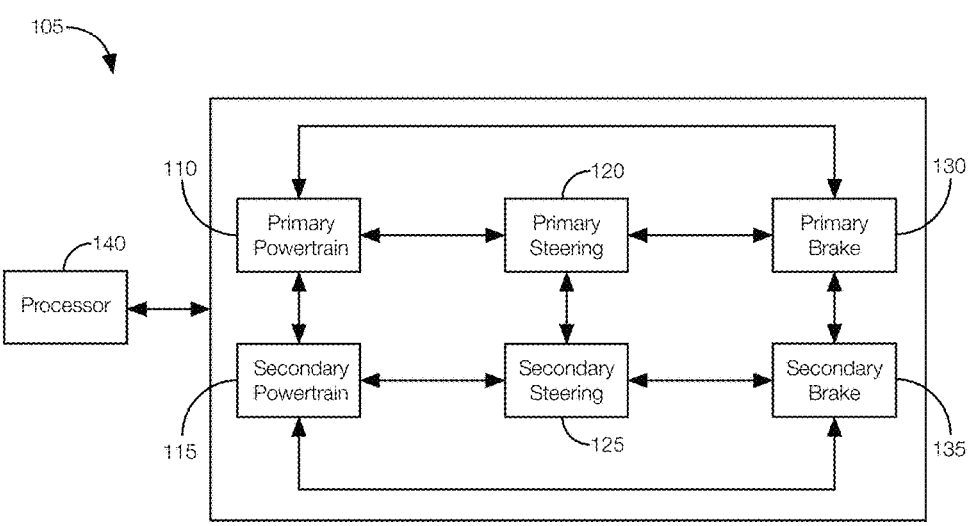
FIG. 2 illustrates example vehicle subsystems in communication with components of the signal routing system.

Referring now to FIG. 2, the signal routing system 105 may monitor various communication paths associated with communications from a primary powertrain subsystem 110, a secondary powertrain subsystem 115, a primary steering subsystem 120, a secondary steering subsystem 125, a primary brake subsystem 130, and a secondary brake subsystem 135. The signal routing system 105 includes a processor 140 in communication with the foregoing subsystems although the communication links between the processor 140 and each subsystem have been omitted from the Figures for purposes of clarity and simplicity.

The primary powertrain subsystem 110 and secondary powertrain subsystem 115 are each implemented via circuits, chips, actuators, controllers, or other electronic components that can monitor and control the operation of various powertrain components. The powertrain of the host vehicle 100 may refer to an internal combustion engine and a transmission. In some instances, the powertrain may further or alternatively refer to an electric motor and battery pack. The primary powertrain subsystem 110 and the secondary powertrain subsystem 115 may output signals to control the engine, the transmission, the electric motor, etc. In some instances, the secondary powertrain subsystem 115 is redundant relative to the primary powertrain subsystem 110. Thus, if the primary powertrain subsystem 110 should fail, or if a communication path between the primary powertrain subsystem 110 and another subsystem or a vehicle component should fail, the secondary powertrain subsystem 115 may output the signals that would ordinarily be output by the primary powertrain subsystem 110.

The primary steering subsystem 120 and the secondary steering subsystem 125 are each implemented via circuits, chips, actuators, controllers, or other electronic components that can monitor or control the operation of various steering components. For instance, the primary steering subsystem 120 and secondary steering subsystem 125 may output signals indicating the angle of rotation of a steering wheel. Moreover, the primary steering subsystem 120 and secondary steering subsystem 125 may output control signals to a power steering motor.

The primary brake subsystem 130 and secondary brake subsystem 135 are each implemented via circuits, chips, actuators, controllers, or other electronic components that can monitor and control the operation of various components associated with braking the vehicle. For instance, the primary brake subsystem 130 and secondary brake subsystem 135 may separately output control signals that actuate the brakes in response to, e.g., a signal from a virtual driver (e.g., an autonomous mode controller) or the driver pressing the brake pedal. Further, the primary brake subsystem 130 and the secondary brake subsystem 135 may output signals that indicate the state or position of the brakes. For instance, the signals may be used to illuminate rear tail lights so that drivers of other vehicles know when the host vehicle 100 is braking.

The processor 140 is implemented via circuits, chips, or other electronic components that can command particular subsystems, such as those identified above, to communicate via various communication paths according to the communication speed associated with each communication path. Thus, the processor 140 may arbitrate communications between various subsystems, especially in instances where a subsystem has failed.

For instance, the processor 140 may be programmed to periodically determine the communication speed for communications between certain subsystems. Not all subsystems may be in direct communication with one another. For instance, in the example arrangement of FIG. 2, the primary steering subsystem 120 is in direct communication with the secondary steering subsystem 125, the primary powertrain subsystem 110, and the primary brake subsystem 130. The primary steering subsystem 120 is not, however, in direct communication with the secondary powertrain subsystem 115 and the secondary brake subsystem 135. Nevertheless, the primary steering subsystem 120 can communicate indirectly with the secondary powertrain subsystem 115 through the primary powertrain subsystem 110 or the secondary steering subsystem 125.

The processor 140 may be programmed to reroute signal communications periodically or in response to, e.g., a failed subsystem or a failed communication link. The term "communication link" may refer to the direct connection between certain subsystems. Each link may individually or collectively form a communication path. For instance, the communication link between the primary steering subsystem 120 and the primary powertrain subsystem 110 may form one communication path while the communication link between the primary steering subsystem 120 and the communication link between the primary powertrain subsystem 110 and the secondary powertrain subsystem 115 may form another communication path.

The processor 140 may be programmed to determine the communication speed for each communication path and store the communication speeds for each path, or at least each link in the path, in a look-up table (see FIG. 4). For instance, the processor 140 may be programmed to measure communication speeds between the various subsystems. Measuring the communication speeds may include monitoring a bus load and transmit rate of data for each link. The communication speeds for each link may be stored in the look-up table. The processor 140 may periodically (on the order of, e.g., every 5 or 10 seconds or so) measure the communication speeds and update the look-up table each time the communication speeds are measured.

After updating the look-up table, or in response to detecting a failure with one or more subsystems or a communication link between subsystems, the processor 140 may be programmed to determine which communication path or paths should be used for each subsystem to communicate with each other subsystem. Determining which communication paths should be used may include the processor 140 being programmed to determine which arrangement of links forms a communication path between subsystems and being programmed to query the look-up table for the speed associated with each link between subsystems. The processor 140 may repeat that for every possible communication path between subsystems. The processor 140 may be programmed to select the fastest communication path, that is, the communication path with the highest speed, and command the subsystems to communicate via the fastest communication paths between the subsystem transmitting the message and its intended destination. To determine which communication path is the fastest, the processor 140 may compare the communication speeds of each path between two subsystems and select the path associated with the fastest speed (lowest overall communication time). Since there are at least two communication paths between each subsystem when each communication link and each subsystem is working properly, selecting the fastest communication path may include comparing the speeds of multiple paths. Even if a communication link or subsystem fails, it is likely that there will remain at least two possible communication paths between subsystems. Thus, the processor 140 may still compare the speeds of at least two communication paths under those circumstances.

After determining which is the fastest communication path between two subsystems, the processor 140 may command the subsystems to communicate in accordance with that communication path. It may be possible that the direction of the communication matters. For instance, the processor 140 may be programmed to identify one communication path between first and secondary subsystems as the fastest when the first subsystem transmits messages to the secondary subsystem but a different communication path as the fastest for when the secondary subsystem transmits messages to the first subsystem.

Figure 3:
FIG. 3 is a table illustrating example communication speeds for different communication links that may form various communication paths.

FIG. 3 illustrates an example look-up table (referred to as a communication speed table) 300 that may be used by the processor 140 to determine the speeds of the different possible communication paths. Moreover, the processor 140 may periodically update the speeds by measuring, e.g., the bus load and transmit rate at each link. The values shown in the table 300 are in milliseconds and are for purposes of illustration only. A value of infinity indicates that there is no direct communication link between the subsystems. A value of zero indicates a location in the table where a subsystem intersects itself, meaning that there is no communication link.

Figure 4A:
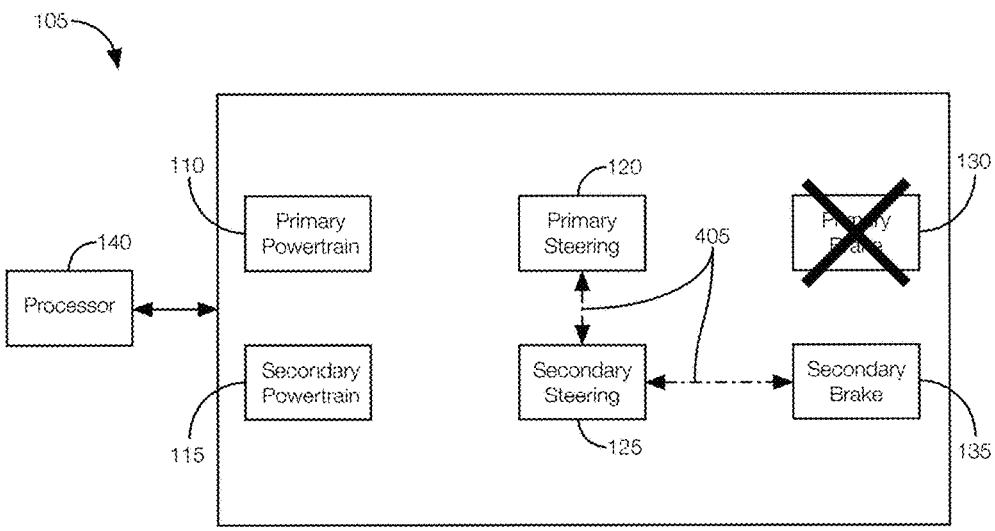
FIG. 4A-4B illustrate different possible communication paths between a primary steering subsystem and a secondary brake subsystem.
Figure 4B:
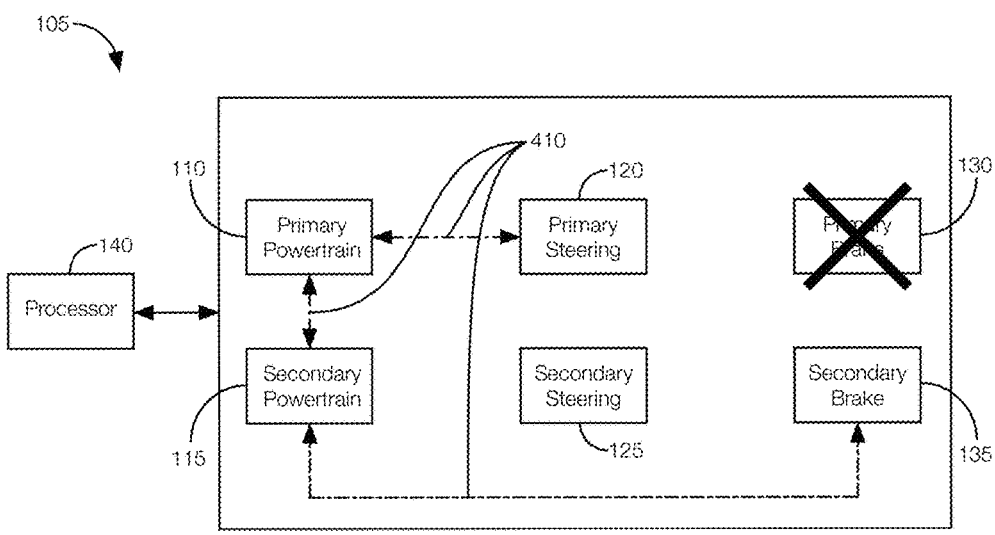

FIGS. 4A and 4B illustrate an example scenario where the primary brake subsystem 130 fails. Before the failure, the primary steering subsystem 120 communicated directly with the primary brake subsystem 130. After the failure, the primary brake subsystem 130 needs to communicate with the secondary brake subsystem 135 but has no direct link with the secondary brake subsystem 135. Thus, the processor 140 may determine the best communication path between the primary steering subsystem 120 and the secondary brake subsystem 135.

As shown in FIGS. 4A and 4B, the processor 140 considers two possible communication paths. The example in FIGS. 4A and 4B have been simplified for purposes of clarity. The processor 140 could be programmed to consider other possible communication links other than the two shown in FIGS. 4A and 4B. Referring to FIG. 4A, one communication path 405 (e.g., a "first communication path") would have the primary steering subsystem 120 communicate with the secondary steering subsystem 125 which would then transmit messages to the secondary brake subsystem 135. Another possible communication path 410 (e.g., a "second communication path"), shown in FIG. 4B, would have the primary steering subsystem 120 communicate with the primary powertrain subsystem 110 which would transmit messages to the secondary powertrain subsystem 115 which would transmit messages to the secondary brake subsystem 135. The processor 140 may determine the communication speed for each link in the first and second communication paths 405, 410.

With reference to the communication speed table 300 of FIG. 3, communicating via the first communication link would take 30 ms (communications from the primary steering subsystem 120 to the secondary steering subsystem 125 takes 10 ms and communications from the secondary steering subsystem 125 to the secondary brake subsystem 135 take 20 ms). Communicating via the secondary communication link would take 50 ms (communications from the primary steering subsystem 120 to the primary powertrain subsystem 110 take 20 ms, communications from the primary powertrain subsystem 110 to the secondary powertrain subsystem 115 take 10 ms, and communications from the secondary powertrain subsystem 115 to the secondary brake subsystem 135 take 20 ms). Thus, the processor 140 may determine that the first communication path 405 is faster than the second communication path 410 since 30 ms (the time to communicate over the first communication path) is faster than 50 ms (the time to communicate over the second communication path). As such, the processor 140 may command the primary steering subsystem 120 to communicate with the secondary brake subsystem 135 via the first communication path 405.

Figure 5:
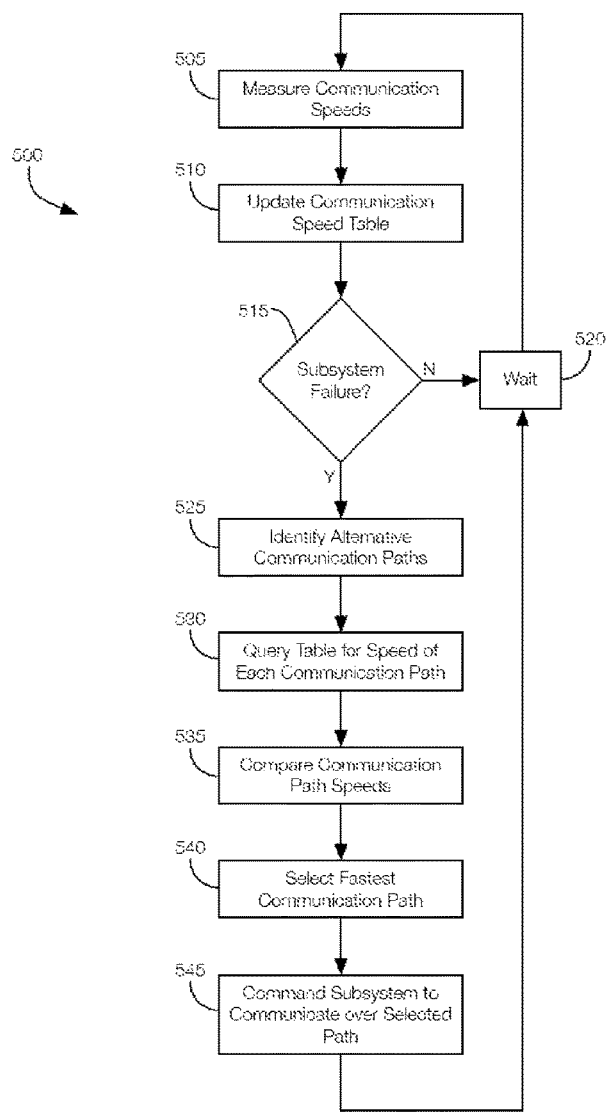
FIG. 5 is a flowchart of an example process that may be executed by the signal routing system to reroute signal communications over different communication paths.

FIG. 5 is a flowchart of an example process 500 that may be implemented by the signal routing system 105 to reroute signals between or among subsystems. The process 500 may begin any time the host vehicle 100 is operating and may continue to run until the host vehicle 100 is turned off.

At block 505, the signal routing system 105 measures the communication speed of each communication link between each of the subsystems. Measuring the communication speed may include the processor 140 monitoring a bus load and transmit rate associated with each communication link. The processor 140 may not measure the bus load and transmit rate for every communication link every time block 505 is executed. For instance, the processor 140 may measure the communication speeds of a subset of communication links.

At block 510, the signal routing system 105 updates the communication speed look-up table. Updating the communication speed look-up table includes the processor 140 updating the processor 140 with the speeds measured at block 505. For instance, the processor 140 may update the look-up table with the transmit rates for each communication link measured at block 505. Since the processor 140 may not measure the bus load and transmit rate for every communication link every time block 505 is executed, the entire look-up table need not be updated every time block 510 is executed.

At decision block 515, the signal routing system 105 determines if one or more subsystems has failed or if a communication link between two subsystems has failed. If no subsystem or communication link failures are detected, the process 500 may proceed to block 520. If the processor 140 detects a subsystem failure or a communication link failure that prevents communication between particular subsystems, the process 500 may proceed to block 525.

At block 520, the signal routing system 105 waits for a predetermined amount of time. The predetermined amount of time may be associated with how often the look-up table is periodically updated. For instance, the processor 140 may wait on the order of 5 or 10 seconds before proceed to block 505.

At block 525, the signal routing system 105 identifies alternative communication paths for a working subsystem that is affected by the failure identified at block 515. For instance, the processor 140 determines which communication links can be used to reroute signals in view of the failed subsystem or communication link. In some instances, rerouting signals may include having one subsystem communicate with a secondary subsystem which in turn communicates with a third subsystem. For example, FIGS. 4A and 4B both illustrate examples where one subsystem (the primary steering subsystem 120) communicates with its destination (the secondary brake subsystem 135) through one or more other subsystems (the secondary steering subsystem 125 in the example of FIG. 4A and the primary powertrain subsystem 110 and the secondary powertrain subsystem 115 in the example of FIG. 4B). The processor 140 may identify any number of alternative communication paths. For instance, the processor 140 may identify at least two alternative communication paths (e.g., a first communication path and a second communication path).

At block 530, the signal routing system 105 queries the look-up table for the communication speeds of the first communication path and the second communication path. For instance, the processor 140 may query the look-up table to determine the amount of time it takes to communicate over each link in a communication path. The processor 140 may sum each of the relevant values from the look-up table to determine the communication speed for each of the alternative communication paths determined at block 525.

At block 535, the signal routing system 105 determines which alternative communication path has the fastest communication speed. That is, the processor 140 may determine which alternative communication path has the lowest cumulative time to communicate from one subsystem to the target subsystem. For instance, if the first communication path is associated with a communication speed of 30 ms (e.g., communications over the first communication path take 30 ms) and the second communication path is associated with a communication speed of 50 ms (e.g., communications over the second communication path take 50 ms), the processor 140 may determine that the first communication path is faster than the second communication path.

At block 540, the signal routing system 105 selects the fastest communication path. Continuing with the example above, the processor 140 may select the first communication path as the fastest communication path since the first communication speed (30 ms) is faster than the secondary communication speed (50 ms).

At block 545, the signal routing system 105 commands the subsystem affected by the failure to communicate in accordance with the communication path selected at block 540. For instance, continuing with the previous example, the processor 140 may command the subsystem to communicate over the first communication path since the first communication path is associated with a faster speed than the second communication path. If the second communication path had been faster than the first, the processor 140 would command the subsystem to communicate over the second communication path.

After block 545, the process 500 may proceed to block 520 so that the communication speeds may be reevaluated and additional subsystem failures or communication link failures may be detected.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
  a first vehicle subsystem;
  a secondary vehicle subsystem;
  a third vehicle subsystem in communication with the second vehicle subsystem;
  a first communication path;
  a second communication path;
  a memory storing a look-up table identifying a first communication speed and a secondary communication speed; and
  a processor programmed to determine the first communication speed associated with communicating over the first communication path and the secondary communication speed associated with communicating over the second communication path and commanding the first vehicle subsystem to communicate over one of the first communication path and the second communication path based at least in part on the first communication speed and the secondary communication speed, wherein the processor is programmed to detect a failure associated with the secondary vehicle subsystem and command the first vehicle subsystem to communicate with the third vehicle subsystem over the first communication path in response to detecting the failure associated with the secondary vehicle subsystem and in response to determining that the first communication speed is faster than the secondary communication speed.

2. The vehicle system of claim 1, wherein the processor is programmed to compare the first communication speed to the secondary communication speed.

3. The vehicle system of claim 2, wherein the processor is programmed to command the first vehicle subsystem to communicate over the first communication path when the first communication speed is faster than the secondary communication speed and command the first vehicle subsystem to communicate over the second communication path when the secondary communication speed is faster than the first communication speed.

4. The vehicle system of claim 1, wherein the processor is programmed to query the look-up table for the first communication speed and the secondary communication speed.

5. The vehicle system of claim 1, wherein the processor is programmed to periodically update the look-up table.

6. The vehicle system of claim 5, wherein the processor is programmed to periodically update at least one of the first communication speed and the secondary communication speed in the look-up table.

7. The vehicle system of claim 6, wherein the processor is programmed to measure at least one of the first communication speed and the secondary communication speed.

8. The vehicle system of claim 7, wherein the processor is programmed to measure at least one of the first communication speed and the secondary communication speed by monitoring a bus load and a transmit rate associated with one of the first communication path and the second communication path.

9. A method comprising:
determining a first communication speed associated with communicating over a first communication path by querying a lookup table stored in a vehicle memory;
determining a secondary communication speed associated with communicating over a second communication path by querying the lookup table stored in the vehicle memory;
commanding a first vehicle subsystem to communicate over one of the first communication path and the second communication path based at least in part on the first communication speed and the secondary communication speed;
detecting a failure associated with a secondary vehicle subsystem; and
commanding the first vehicle subsystem to communicate with a third vehicle subsystem over the first communication path as a result of detecting the failure associated with the secondary vehicle subsystem and as a result of determining that the first communication speed is faster than the secondary communication speed.

10. The method of claim 9, further comprising comparing the first communication speed to the secondary communication speed.

11. The method of claim 10, wherein commanding the first vehicle subsystem to communicate over one of the first communication path and the second communication path includes commanding the first vehicle subsystem to communicate over the first communication path when the first communication speed is faster than the secondary communication speed and commanding the first vehicle subsystem to communicate over the second communication path when the secondary communication speed is faster than the first communication speed.

12. The method of claim 9, further comprising periodically updating the look-up table.

13. The method of claim 12, wherein periodically updating the look-up table includes periodically updating at least one of the first communication speed and the secondary communication speed in the look-up table.

14. The method of claim 13, further comprising measuring at least one of the first communication speed and the secondary communication speed.

15. The method of claim 14, wherein measuring at least one of the first communication speed and the secondary communication speed includes monitoring a bus load and a transmit rate associated with one of the first communication path and the second communication path.

* * * * *